United States Patent
Campbell et al.

(10) Patent No.: US 11,500,774 B2
(45) Date of Patent: *Nov. 15, 2022

(54) VIRTUAL CACHE TAG RENAMING FOR SYNONYM HANDLING

(71) Applicant: International Business Machines Corporation, Armonk, NY (US)

(72) Inventors: David Campbell, Austin, TX (US); Bryan Lloyd, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/196,520

(22) Filed: Mar. 9, 2021

(65) Prior Publication Data

US 2021/0191866 A1 Jun. 24, 2021

Related U.S. Application Data

(63) Continuation of application No. 16/265,081, filed on Feb. 1, 2019, now Pat. No. 10,977,175.

(51) Int. Cl.
*G06F 12/08* (2016.01)
*G06F 12/0815* (2016.01)

(52) U.S. Cl.
CPC .. *G06F 12/0815* (2013.01); *G06F 2212/1021* (2013.01); *G06F 2212/152* (2013.01)

(58) Field of Classification Search
CPC ......... G06F 12/0815; G06F 2212/1021; G06F 2212/152
See application file for complete search history.

(56) References Cited

U.S. PATENT DOCUMENTS

| | | | | |
|---|---|---|---|---|
| 5,367,660 | A | * | 11/1994 | Gat ...................... G06F 12/0815 711/123 |
| 9,632,939 | B2 | | 4/2017 | Yu et al. |
| 9,940,262 | B2 | | 4/2018 | Sundar et al. |
| 2008/0082721 | A1 | * | 4/2008 | Yu ........................ G06F 12/0864 711/3 |
| 2013/0185520 | A1 | * | 7/2013 | Dieffenderfer ...... G06F 12/1063 711/144 |
| 2016/0224471 | A1 | * | 8/2016 | Avudaiyappan .... G06F 12/1054 |

(Continued)

OTHER PUBLICATIONS

Qiu, et al., "The Synonym Lookaside Buffer: A Solution to the Synonym Problem in Virtual Caches," IEEE Transactions on Computers 57, No. 12, 2008, pp. 1585-1599 (Year: 2008).

(Continued)

*Primary Examiner* — Masud K Khan
(74) *Attorney, Agent, or Firm* — Scully, Scott, Murphy & Presser, P.C.

(57) ABSTRACT

A system and method of handling access demands in a virtual cache comprising, by a processing system, checking if a virtual cache access demand missed because of a synonym tagged in the virtual cache; in response to the virtual cache access demand missing because of a synonym tagged in the virtual cache, updating the virtual address tag in the virtual cache to a new virtual address tag; searching for additional synonyms tagged in the virtual cache; and in response to finding additional synonyms tagged in the virtual cache, updating the virtual address tag of the additional synonyms to the new virtual address tag.

20 Claims, 5 Drawing Sheets

(56) References Cited

U.S. PATENT DOCUMENTS

2017/0109289 A1\* 4/2017 Gonzalez Gonzalez ................... G06F 12/0895
2018/0095765 A1   4/2018 Mekkat et al.

OTHER PUBLICATIONS

Yoon et al., "Revisiting Virtual L 1 Caches: A Practical Design Using Dynamic Synonym Remapping," 2016 IEEE International Symposium on High Performance Computer Architecture (HPCA), pp. 212-224, IEEE, 2016 (Year: 2016).
List of IBM Patents or Patent Applications Treated as Related dated Mar. 9, 2021, 2 pages.

\* cited by examiner

VIRTUAL CACHE TAG RENAMING FOR SYNONYM HANDLING

BACKGROUND

The disclosure herein relates generally to information handling and/or data processing systems, and more particularly, to methods, apparatuses, and systems for handling synonyms in virtual caches in a computer system.

Among other tasks, memory management manages the data stored in a computer including overseeing the retrieval and storage of data from memory in a computer. Memory management is often a key factor in overall system performance for a computer. Computer systems often include physical memory used to store applications and data. Modern computers typically rely on a memory management technique known as virtual memory management to increase performance and provide greater flexibility in computers and the underlying architectural designs upon which they are premised.

Virtual memory management systems can include a hypervisor or virtual machine monitor (VVM), which is computer software, firmware, or hardware that creates and runs multiple virtual machines as guests on a computer where computing resources such as memory and processing capability are shared. With a virtual memory system, the underlying hardware implementing the memory system of a computer is effectively hidden from the software of the computer. Computer programs that execute on the computer access the memory system using addresses pointing to locations in the virtual memory space. The physical memory devices in the computer, however, are accessed via "real" addresses that map directly into specific memory locations in physical memory devices. Hardware and/or software in the computer are provided to perform "address translation" to map the real memory addresses of the physical memory to virtualized addresses in the virtual memory space. As such, whenever a computer program on a computer attempts to access memory using a virtualized address, the computer translates the virtualized address into a corresponding real address so that access can be made to the appropriate location in the appropriate physical device mapped to the virtualized address.

Address translation in a virtual memory system typically incorporates accessing various address translation data structures. One such structure, referred to as a page table, includes multiple entries, referred to as page table entries (PTEs), that map virtualized addresses to real addresses on a page-by-page basis. Often, due to the large number of memory accesses that constantly occur in a computer, the number of page table entries (PTEs) required to map all of the memory address space in use by a computer can be significant, and requires the entries to be stored in main storage, rather than in dedicated memory, which makes accessing such entries slow.

To accelerate address translation, high-speed memories referred to as translation look-aside buffers (TLB) are typically used to cache recently-used entries for quick access by the computer. With each memory access, the address to be translated is presented to the TLB, and if the TLB hits (has a matching entry), then the TLB provides an address to the processor. If the address misses in the TLB, a more costly hardware handler or software handler is invoked to load and insert the required address translation entry into the TLB so the address will hit in the TLB and the memory access can proceed.

Due to the frequency of memory access requests in a computer, address translation can have a significant impact on overall system performance. As such, it is desirable to minimize the amount of time to provide address translations.

SUMMARY

The summary of the disclosure is given to aid understanding of a computer system, computer architectural structure, processor, virtual caches, and method of translating addresses in a computer system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

A method of handling access demands in a virtual cache is disclosed that includes in one or more embodiments, by a processing system checking if a virtual cache access demand missed because of a synonym tagged in the virtual cache, in response to the virtual cache access demand missing because of a synonym tagged in the virtual cache, updating the virtual address tag in the virtual cache to a new virtual address tag, searching for additional synonyms tagged in the virtual cache, and in response to finding additional synonyms tagged in the virtual cache, updating the virtual address tag of the additional synonyms to the new virtual address tag. In an aspect, the method includes, in response to the virtual cache having additional synonyms in the virtual cache, updating the virtual address tag of at least one of the additional synonyms in the virtual cache to the virtual address tag corresponding to the virtual address of the virtual cache access demand that missed in the virtual cache. In an embodiment, searching for additional synonyms tagged in the virtual cache further comprises searching for other cache lines within the page corresponding to the virtual address tag of the virtual cache access demand that missed in the virtual cache, and in an aspect, a state machine is allocated to search for additional cache lines within the page. The method further includes in an embodiment, in response to finding additional cache lines within the page corresponding to the virtual address of the virtual cache access demand that missed in the virtual cache, determining whether the additional cache lines are in the virtual cache, updating the virtual address of the additional cache lines by renaming the virtual address of the additional cache lines to the virtual address of the virtual cache access demand that missed in the virtual cache.

In another aspect, a computing system is disclosed that has a virtual cache having a plurality of entries having a virtual address and associated data, a physical cache having a plurality of entries for storing data; and a processor. The system, in one or more embodiments, is configured to check if a virtual cache access demand missed because of a synonym tagged in the virtual cache; in response to the virtual cache missing because of a synonym tagged in the virtual cache, update the virtual address tag in the virtual cache to a new virtual address tag; search for additional synonyms tagged in the virtual cache; and in response to finding additional synonyms tagged in the virtual cache, update the virtual address tag to the new virtual address tag. The processor is further configured, in an embodiment, to search for other cache lines within the page corresponding to the virtual address tag of the virtual cache access demand that missed in the virtual cache. In response to finding additional cache lines within the page corresponding to the virtual address of the virtual cache access demand that missed in the virtual cache, the processor in an aspect is configured to determine whether the additional cache lines are in the virtual cache, and to update the virtual address of the additional cache lines to the virtual cache access demand that missed in the virtual cache.

In a further embodiment a computing system is disclosed that includes a virtual cache having a plurality of entries, wherein each entry has a virtual address and associated data, a physical cache having a plurality of entries for storing data, a processor; and a non-transitory computer-readable storage medium comprising program instructions. The program instructions, in one or more embodiments, when executed by the processor cause the processor to: check if a virtual cache access demand missed because of a synonym tagged in the virtual cache; in response to the virtual cache missing because of a synonym tagged in the virtual cache, update the virtual address tag in the virtual cache to a new virtual address tag; search for additional synonyms tagged in the virtual cache; and in response to finding additional synonyms tagged in the virtual cache, update the virtual address tag to the new virtual address tag. The program instructions, when executed by the processor, cause the processor to search for other cache lines within the page corresponding to the virtual address tag of the virtual cache access demand that missed in the virtual cache.

The foregoing and other objects, features and advantages of the invention will be apparent from the following more particular descriptions of exemplary embodiments of the invention as illustrated in the accompanying drawings wherein like reference numbers generally represent like parts of illustrative embodiments of the invention.

BRIEF DESCRIPTION OF THE DRAWINGS

The various aspects, features and embodiments of a computer system, computer architectural structure, processor, virtual caches, and their method of operation will be better understood when read in conjunction with the figures provided. Embodiments are provided in the figures for the purpose of illustrating aspects, features, and/or various embodiments of the computer system, computer architectural structure, processors, virtual caches, and their method of operation, but the claims should not be limited to the precise arrangement, structures, features, aspects, assemblies, subassemblies, systems, circuitry, embodiments, methods, processes, techniques, and/or devices shown, and the arrangements, structures, systems, assemblies, subassemblies, features, aspects, methods, processes, techniques, circuitry, embodiments, and devices shown may be used singularly or in combination with other arrangements, structures, assemblies, subassemblies, systems, features, aspects, circuitry, embodiments, methods, techniques, processes, and/or devices.

DETAILED DESCRIPTION

Figure 1:
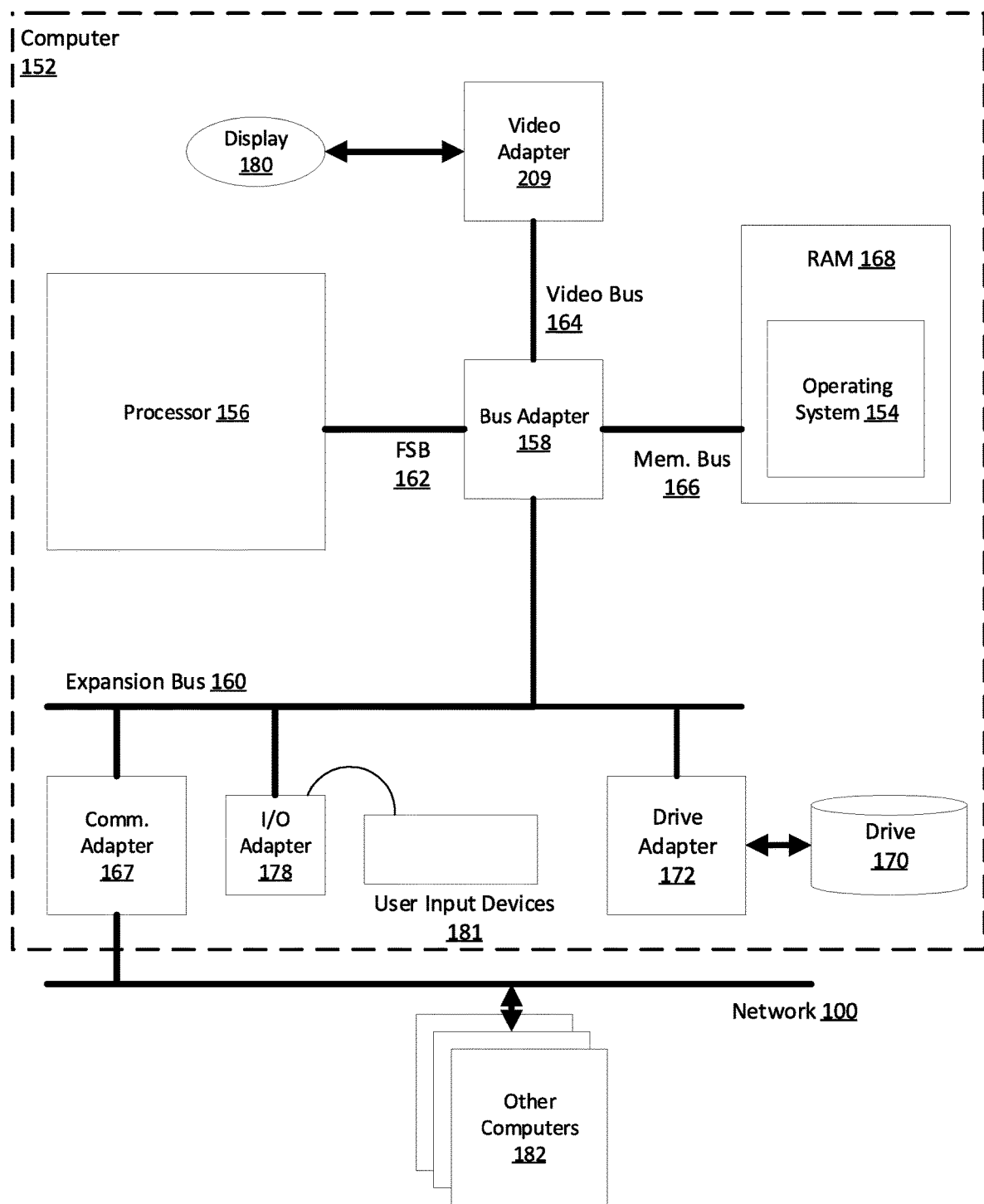
FIG. 1 is a functional block diagram illustrating a computer system, according to embodiments of the present disclosure.

The following description is made for illustrating the general principles of the invention and is not meant to limit the inventive concepts claimed herein. In the following detailed description, numerous details are set forth in order to provide an understanding of the computer system, computer architectural structure, processor, virtual caches, and their method of operation, however, it will be understood by those skilled in the art that different and numerous embodiments of the computer system, computer architectural structure, processor, virtual caches, and their method of operation may be practiced without those specific details, and the claims and disclosure should not be limited to the arrangements, structures, systems, assemblies, subassemblies, circuitry, features, aspects, processes, methods, techniques, embodiments, and/or details specifically described and shown herein. Further, particular features, aspects, arrangements, systems, embodiments, techniques, etc. described herein can be used in combination with other described features, aspects, arrangements, systems, embodiments, techniques, etc. in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification and claims, specify the presence of stated features, integers, aspects, arrangements, embodiments, structures, systems, assemblies, subassemblies, steps, operations, elements, and/or components, but do not preclude the presence or addition of one or more other features, integers, aspects, arrangements, embodiments, structures, systems, assemblies, subassemblies, steps, operations, elements, components, and/or groups thereof.

The following discussion omits or only briefly describes conventional features of information processing systems, including processors and microprocessor systems and architectures, as well as address translation techniques and systems, which should be apparent to those skilled in the art. It is assumed that those skilled in the art are familiar with the general architecture of processors, and in particular with address translation techniques and systems, and their operation. It may be noted that a numbered element is numbered according to the figure in which the element is introduced, and is typically referred to by that number throughout succeeding figures.

Modern computer systems including systems using virtualized memory management can include a hypervisor or virtual machine monitor (VMM), which is computer software, firmware, or hardware that creates and runs multiple virtual machines as guests on a computer where computing resources such as memory and processing capability are shared. In virtualized systems, the system uses virtual caches in the microprocessor where the virtual cache directory is tagged with the virtualized address instead of the physical address. Virtual caches that utilize virtually addresses as opposed to physical addresses are also used in non-virtualized systems as well. With virtual caches it is possible to have multiple different virtual addresses that will be translated to the same physical address via the operating systems virtual memory management. This is sometimes referred to as the synonym problem in virtual caches.

Having synonyms in a virtual cache can become a performance issue because the virtual cache could have many virtual tags that represent the same data which is tracked by (located in) only one physical address. For example, if a first access to the virtual cache has a virtual address VA(1), and a second access to the virtual cache has a virtual address VA(2), but both virtual addresses VA(1) and VA(2) translate (refer back, point) to the same physical (real) address RA(1) in the system, then since the cache is virtually tagged, the two synonym virtual addresses (VA(1) and VA(2)) would thrash the cache because the second access to VA(2) would miscompare on the tag that the first access VA(1) used to reference the data. This occurs because, in one or more embodiment, to correctly maintain load-store tracking in an out-of-order processor, a single physically accessible cache line can exist in one location of a virtual cache.

Disclosed are techniques and systems to detect synonyms in a virtual cache and in an embodiment rename the cache lines in the virtual cache. In one or more embodiments, the state machine that detects the synonym searches for other cache lines within the page to rename those cache lines. In one or more embodiments, a state machine will be allocated to find other synonyms or aliases in cache lines within the page and rename them in the virtually tagged cache. Disclosed are techniques and systems to rename virtual addresses so that less overall cache misses will occur to improve processor performance.

Virtual caches and virtual cache accesses typically occurs in a data or information handling environment, and more specifically commonly in a processor based system and/or a computerized environment. FIG. 1 is a functional block diagram illustrating a computer system 150 in which embodiments of the disclosure may be practiced. The system 150 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152.

Although the processor 156 is shown to be coupled to RAM 168 through the front side bus 162, the bus adapter 158, and the high speed memory bus 166, those of ordinary skill in the art will recognize that such configuration is only an exemplary implementation and other configurations of coupling the processor 156 to other components of the system 150 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 being located in RAM 168, other components of such as data processing applications may be stored in the RAM 168. Furthermore, software and other components may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 174. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

Figure 2A:
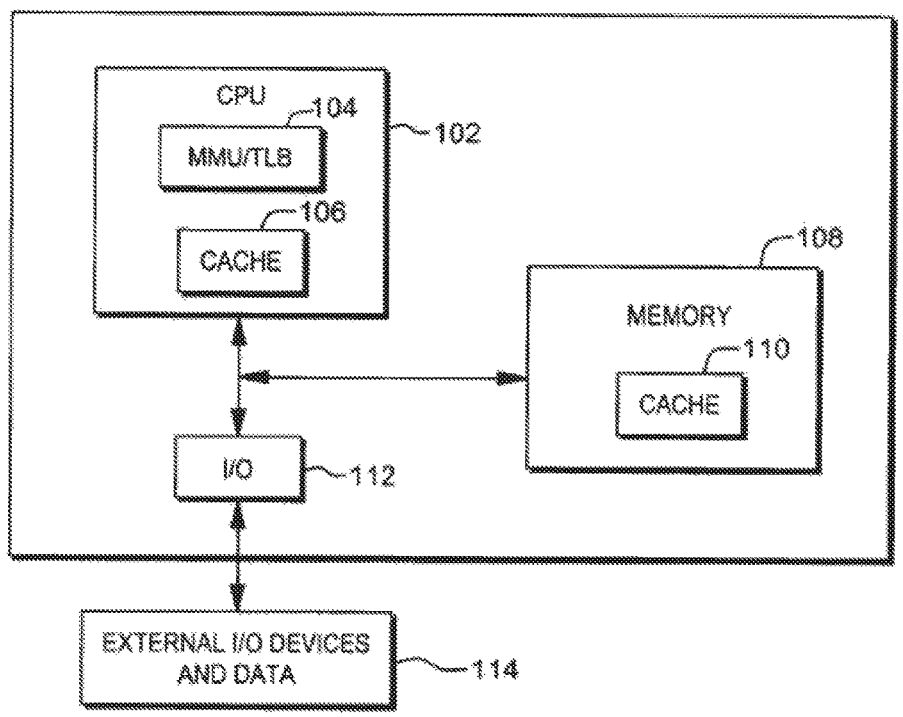
FIG. 2A depicts an example of a computing environment.

One example of a computing environment to incorporate and use one or more virtual caches and virtual cache access techniques is described with reference to FIG. 2A. In one example, a computing environment 150 includes a processor (central processing unit—CPU) 102 that includes at least a cache 106 and at least one memory management unit (MMU) having a translation look-aside buffer (TLB), referred to as MMU/TLB portion 104. Processor 102 is communicatively coupled to a memory portion 108 having a cache 110, and to an input/output (I/O) portion 112. I/O portion 112 is communicatively coupled to external I/O devices 114 that may include, for example, data input devices, sensors and/or output devices, such as displays.

Memory management unit 104 is used in managing memory portion 108 including facilitating access to the memory by providing address translation. In an embodiment, to improve address translation, the memory management unit (MMU) utilizes a translation look-aside buffer (TLB). The TLB is a cache of previously translated addresses. Thus, when a request is received for a memory access that includes an address to be translated, typically the TLB is checked first. If the address is cached in the TLB, then the address is provided to the processor. Otherwise, the received address is translated using one of any number of translation techniques.

Figure 2C:
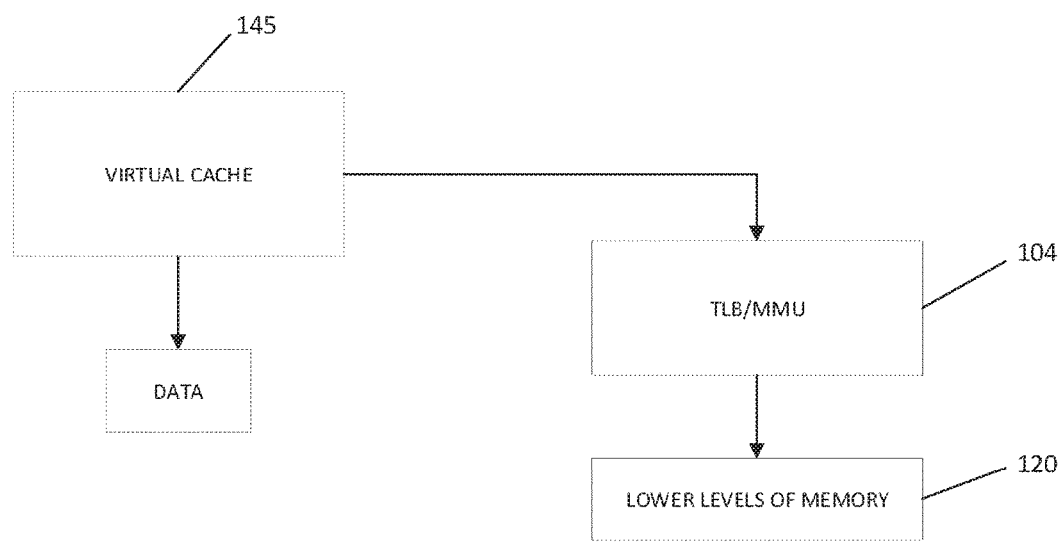
FIG. 2C depicts an example of a virtual cache in a computing environment.
Figure 2B:
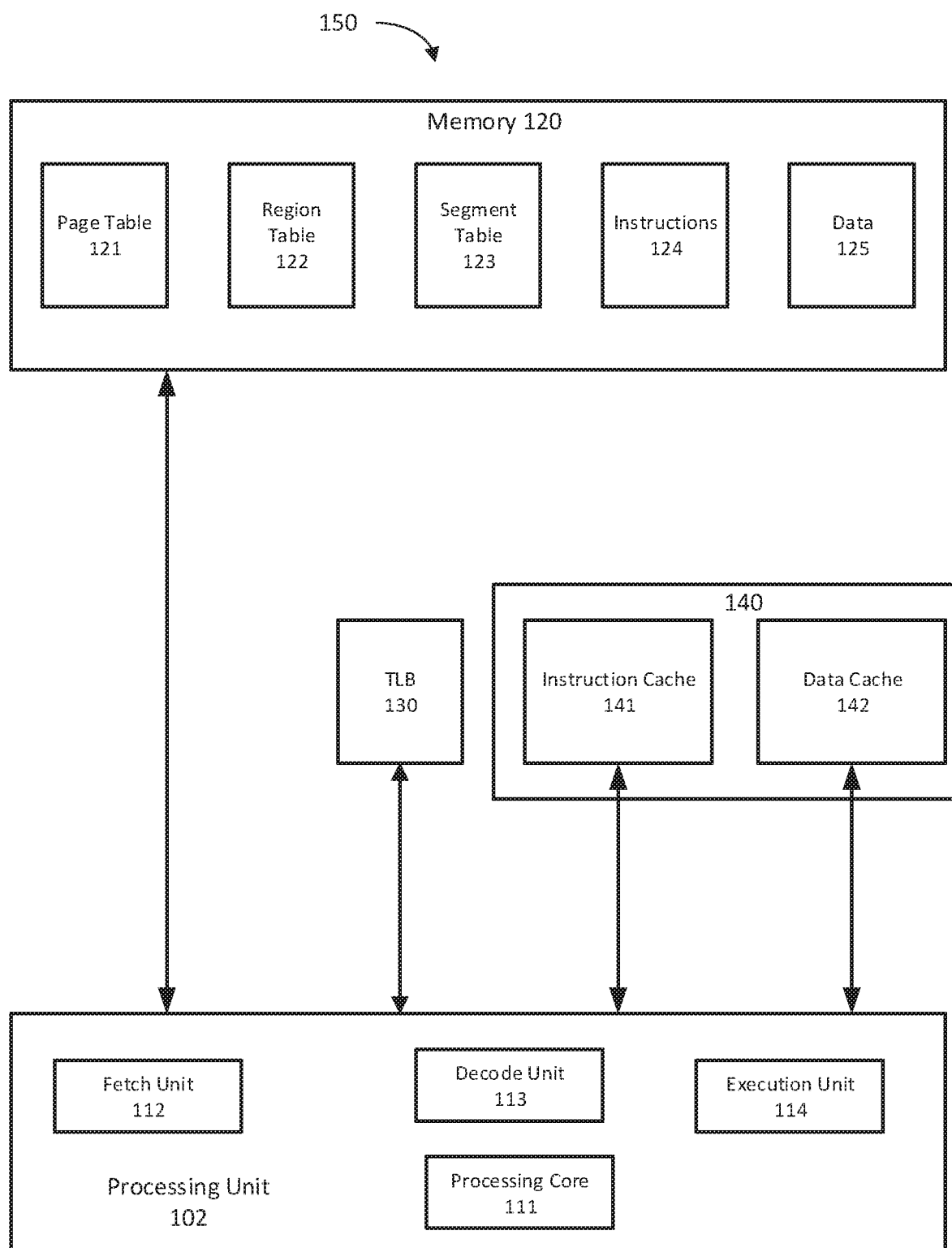
FIG. 2B depicts another example of a computing environment.

FIG. 2B illustrates a block diagram of an embodiment of a processing system 150. The processing system 150 includes a processing unit 102, memory 120, a translation look-aside buffer 130, and cache memory 140. Cache memory 140 includes instruction cache 141 and the data cache 142, which store instructions and data, respectively, for quick access by the processing unit 102 during execution of instructions.

The processing unit 102 receives data, such as operand data and instructions, and executes the instructions. The processing unit 102 may include, for example, a processing core 111 including logic and other circuitry for processing data and instructions, a fetch unit 112 configured to fetch instructions, a decode unit 113 configured to decode instructions, and an execution unit 114 configured to execute the instructions. Although a few functional units of the processing unit 102 are illustrated for purposes of description, it is understood that the processing unit 102 may include additional functional units for retrieving, processing, and storing instructions and data.

Processing system 150 further includes memory 120 configured to store instructions 124 and data 125 which may be accessed and manipulated by the instructions 124. The memory 120 can include volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cassette or the like, etc.). Moreover, the memory 120 may incorporate electronic, magnetic, optical, and/or other types of storage media. In some embodiments, the memory 120 may have a distributed architecture, where various components are situated remote from one another, but can be accessed by the processing unit 102. In this disclosure, the terms physical memory, real memory, system memory and absolute memory are used interchangeably to refer to the main storage accessible to a physical processor.

Address translation in a virtual memory system typically incorporates accessing various address translation data structures. Memory 120 includes dynamic address translation structures, such as a page table 121, region table 122, and segment table 123. Page table 121 includes multiple entries that map virtual addresses to real addresses on a page-by-page basis. Likewise, for handling segmentation, segment table 123 includes entries that map effective addresses to virtual addresses on a segment-by-segment basis.

Page table 121 maps addresses on a page-by-page basis and includes one or more page table entries (PTEs). TLB 130 is a data structure used for storing some of the address mappings by caching entries (PTEs) from page table 121 located in memory 120. In the embodiment of FIG. 2B, TLB 130 stores mappings from virtual memory addresses (VA) to physical memory or real addresses (RA). The TLB in FIG. 2B may include virtual addresses, real addresses corresponding to the virtual addresses, and additional information that categorizes or defines one or more of the virtual addresses and the real addresses or provides information to a processing unit about the real address or the virtual address.

In the embodiment of FIG. 2B, in operation, the fetch unit 112 fetches an instruction from memory 120 or from the instruction cache 141. The decode unit 113 reads the instruction and determines or identifies one or more virtualized addresses referenced by the instruction. The decode unit 113 may access the TLB 130 for address translation, e.g., virtual-to-real address translation. If the virtualized address is included as an entry in the TLB, the real address (RA) is provided to the CPU, along with any additional information in the entry, such as data access information, page size, etc., and the system can proceed to use the corresponding physical memory address received from the TLB. If the virtual-to-real address translation is not found in the TLB 130, the processing unit 102 may access the page table 121 to obtain a virtual-to-real address translation. Once a virtual-to-real address translation is built or accessed from the page table 121, the virtual-to-real address translation may be loaded (stored) in the TLB 130 for quick access.

FIG. 2C illustrates a block diagram of another embodiment of a processing system 150. The processing system 150 includes a processing unit 102 (not shown), memory 120, a translation look-aside buffer (TLB/MMU) 104, and virtual cache memory 145. Accesses to virtual cache 145 are made using virtual addresses and if the virtual cache hits, e.g., there is a match in the virtual cache 145, then the referenced (mapped) data is supplied. If there is a miss in the virtual cache, the virtual address is sent to the TLB/MMU 104 for translation to a real address (RA), and the access is sent to memory 120 to retrieve the data.

Virtual addresses are often partitioned for the purposes of address translation into offset bits and effective address bits, with the offset bits pointing to a specific address in a page. The effective address bits or the effective page number (EPN) may include tag bits and set-index bits. TLB entries generally only map a certain number of bits from a virtual address to a corresponding number of bits in a physical address. The number of bits mapped is a function of the page size associated with the virtual address. For example, for a 4 KB page size, the first 12 bits of the physical address represent offset bits within a page, because 12 bits are sufficient to address every memory location within a 4 KB page. In another example, for a 1 GB page size, the first 30 bits of the physical address represent offset bits within a page, and the remaining 34 bits would be effective address bits.

Figure 3:
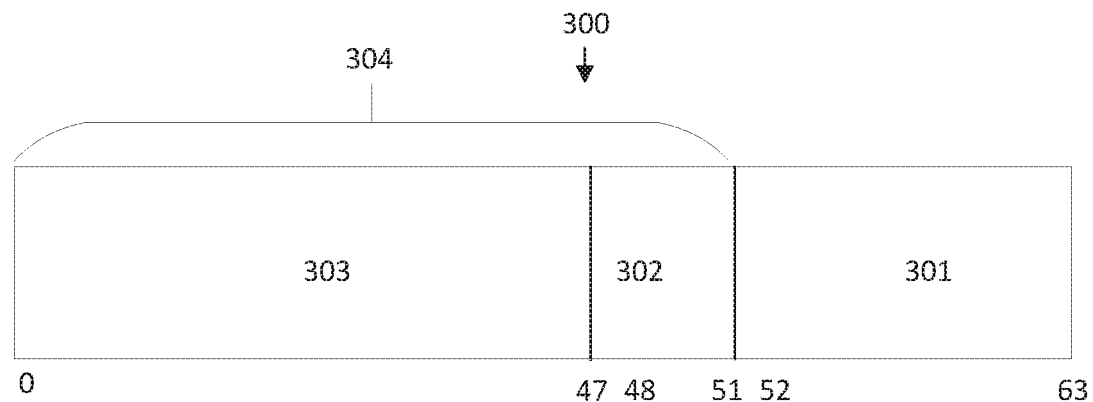
FIG. 3 illustrates an example of portions of a virtual address for use in translation.
Figure 3:
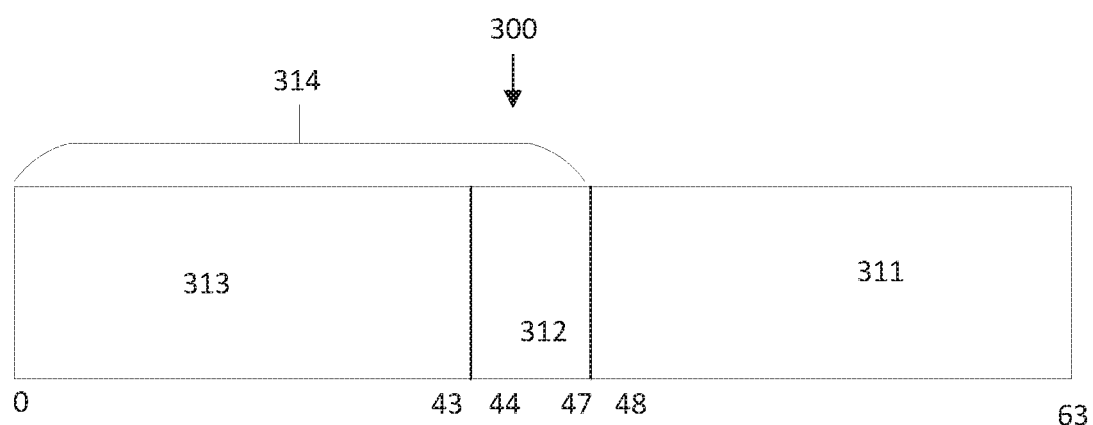

FIG. 3 shows a virtual address 300 comparison for a 4 KB page (top) and for a 64 KB page (bottom). For a 4 KB page virtual address (top bit field), offset bits 301 would be [52:63], and effective address bits 304 would be [0:51] where the set-bits 302 would be [48:51], and the tag bits 303 would be [0:47]. In contrast, for a 64 KB page virtual address (bottom bit field), the offset bits 311 would be [48:63], and the effective address bits 314 would be bits [0:47] where the set bits 312 would be [44:47], and the tag bits 313 would be [0:43] (a larger offset would logically be required to address the larger page size).

When using a virtual cache in a micro-processor, the cache directory is tagged with the virtualized address instead of the physical address. In this type of design, it is possible to have multiple different virtual addresses that will be translated to the same physical address via the operating system's virtual memory management. When multiple virtual addresses translate or refer back to the same physical address, it is often referred to as the synonym or alias problem in virtual caches. The synonym or alias problem can become a performance issue because the virtual cache can have many virtual tags that represent the same data which is tracked by only one physical address. If a first access to the virtual cache has a virtual address VA(1) and a second access to the virtual cache has a virtual address VA(2), and both VA(1) and VA(2) translate back to the same physical address of the machine RA(1), then the two synonym virtual addresses would thrash the cache because VA(2) would miscompare on the tag that VA(1) used to reference the data.

In addition, in order to maintain correct load-store tracking in an out-of-order processor, a single or the same physical addressable cache line can exist in only one location of the virtual cache. This property of maintaining a single physical address in the virtual cache is upheld or applied upon virtual cache misses. In other words, when there is a virtual cache miss, the processor checks to determine whether there is more than one virtual address referring to or mapped to the same physical address. In the scenario where VA(2) accesses the cache but misses the cache because VA(2) address would miscompare on the tag that VA(1) used to reference the data, a search algorithm is used to identify if VA(2) would have hit in the virtual cache if it were a physical tagged cache. That is, the processor checks if the virtual cache has synonyms or aliases by checking if the miss in the virtually tagged cache would have hit in a physically tagged cache. In such a case, upon the cache miss, the VA(2) access will not evict a virtual cache tag in the virtual cache, but instead the eviction process (LRU algorithm) is overridden and the VA(1) virtual tag associated with RA(1) is renamed with the VA(2) tag. In other words, the physical address is maintained at a single location of the virtual cache, but the VA(2) tag overwrites the VA(1) tag in the virtual cache's tag directory.

As described earlier, translations of virtual addresses typically are performed on a page granularity. When a synonym exists it also typically exists on the granularity of the system page size. Virtual caches in one or more embodiments are tagged with cache lines that are smaller than the page size. That is, a single page typically has many cache lines. For example, a cache line can have 128 bytes and there would be 512 cache lines in a 64K page. When a virtual cache misses, the virtual cache is typically replenished with a single cache line, usually using a least recently used (LRU) algorithm or other prioritizing algorithm. When a virtual cache access is performed, e.g., VA(2) access, and a synonym is discovered as described above for a single cache line, it is possible that many other cache lines exist in the virtual cache that also have the synonym or alias problem, which can create performance problems as the system detects the problems and overcomes the problem separately in each instance.

Disclosed is a method and system for handling data in a virtual cache, and more particularly handling virtual cache access demands including in instances where a synonym or alias situation arises. In one or more embodiments, the method and system provides improved performance. In an embodiment, where a cache line synonym is detected, the rest of the cache lines tagged in the virtual cache are detected and other cache lines within the page are renamed in the virtual cache, preferably before a further demand access is made. If the virtual cache is renamed from the first virtual address VA(1) to the second virtual address VA(2) before the system accesses the other cache lines in the virtual cache for the second virtual address VA(2), the system will incur less overall virtual cache misses due to synonyms or aliases and performance will improve.

In one or more embodiments, an alias or synonym is detected for a single cache line. After detecting a synonym, in an embodiment the same translation is used to find other cache lines in that page. When other cache lines that are present in the page are searched and found in the virtual cache, those additional cache lines in the virtual cache in an embodiment are also renamed. In other words, in one or more embodiments, when the algorithm for identifying synonyms is triggered on detection of a first synonym and indicates a synonym related cache miss on the first access to a page in the virtual cache, a state machine and/or logic will be allocated to find other aliases or synonyms in cache lines within that page and rename them in the virtually tagged cache, preferably ahead of the access demand to the virtual cache. In an embodiment, after detecting additional cache lines in the page corresponding to the virtual address of the virtual cache access, the virtual cache is searched to determine if those additional cache lines are in the virtual cache, and if so, those cache lines are renamed in the virtual cache to the tag of the virtual address of the virtual cache access. That is, when an access to the virtual cache observes and detects a synonym and overwrites the first virtual address tag to the second virtual address tag, the renamer then tries to identify more cache lines with that property in the cache.

Figure 4:
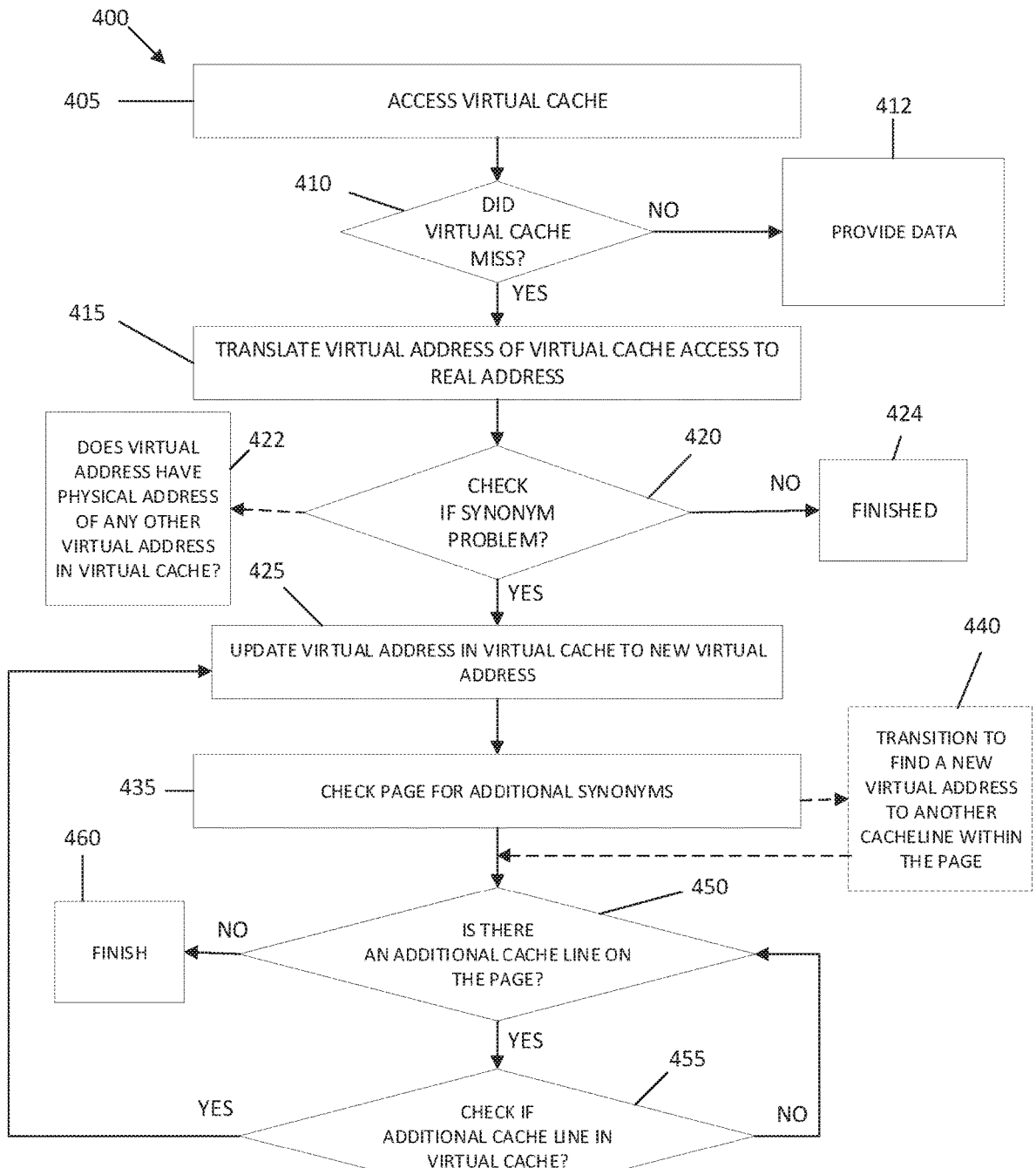
FIG. 4 is an exemplary flowchart illustrating and describing a method of handling synonyms in an information handling and/or data processing system.

FIG. 4 is an exemplary flowchart in accordance with one or more embodiments illustrating and describing a method of handling accesses to a virtual cache, including handling synonyms in virtual caches, more specifically an example of a method of detecting and renaming multiple synonyms in a virtual cache. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4, but the process may be integrated and/or one or more steps may be performed together, simultaneously, or the steps may be performed in the order disclosed or in an alternate order.

In one or more embodiments, at 405 there is an access to the virtual tagged cache. In an embodiment, the virtual cache has already been primed, e.g., has a first virtual address VA(1) in the virtual cache that translates to real address (RA(1)) in physical memory. In one or more embodiments, the access at 405 is to second virtual address VA(2) in the virtual cache. The access to the second virtual address VA(2) in an embodiment is to the same real address (RA(1)) as was the first access to first virtual address VA(1). In such a scenario, the second access to the second virtual address VA(2) would miss in the virtual cache.

At 410 it is determined whether the virtual cache misses on the access to the virtual cache, e.g., access to the second virtual address VA(2). If the access to the virtual cache does not miss (410: No), then the method 400 continues to 412 and the data related to the virtual address in the virtual cache is provided. If the access to the virtual cache misses (410: Yes), then the method 400 continues to 415 where the virtual address is translated to a real address to identify the physical address of the memory access.

At 420 it is checked whether the virtual cache miss occurred because of a synonym problem. In one or more embodiments, the physical address of the virtual cache demand access is checked if the miss occurred due to a synonym. In an aspect, the processor at 422 checks to determine whether the virtual address of the virtual cache access that missed has the same physical real address of any other virtual address in the virtual cache.

In an illustrative example of checking for synonyms, in one or more embodiments, a renamer state machine is allocated that collects the virtual address of the miss and the page size of the virtual cache access. The renamer in an aspect generates a virtual address at the base of the page's memory region. The renamer sends the generated virtual address through translation to resolve the physical address of the cache line. The renamer will check if the same physical address of the new cache line is stored in the virtually tagged cache. In an aspect, a search algorithm is used to identify if the virtual cache access that triggered the miss, e.g., VA(2), would have hit if it were a physically cache. The following is one method of detecting synonyms, and other methods of detecting synonyms are equally applicable to method 400 of handling accesses, including access to synonyms, in a virtual cache.

If it is determined that there is not a synonym problem, e.g., the cache miss was not caused by two or more cache lines in the virtual cache referring to the same physical address, then the process continues at 424 where the process of handling synonyms is finished until the next virtual cache miss. On the other hand, if the cache miss was because there is a synonym problem in the virtual cache (420: Yes; 422: Yes), then the method 400 continues to 425 where the virtually tagged cache's tag store is updated to the new virtual address of the virtual cache access demand. According to one embodiment, where the virtual cache miss is because of a synonym issue in the virtual cache, the virtual cache will not evict an entry in the virtual cache, such as, for example, by use of a least recently used (LRU) algorithm, but rather, when a synonym is detected, the eviction method and use of the replacement algorithm, e.g., LRU algorithm, will be overridden such that the virtual tag in the virtual cache referring to the same physical address, e.g., RA(1), will be renamed with the virtual address, e.g., VA(2), of the virtual cache access that missed. In other words, the physical address is maintained in the entry (location) in the virtual cache, but the virtual address of the more recent virtual cache access that missed in the virtual cache over writes the old virtual address in the virtual cache's tag store, e.g., VA(2) has over written VA(1) in the virtual cache.

At 435 the process continues where the page corresponding to the virtual address of the virtual cache miss is checked to determine if there are other synonyms. In an embodiment, at 440 the renamer will increment or move the virtual address to another or additional cacheline on the page, and in an example will access the previous virtual address plus a cache line offset. As an example, the renamer can proceed or increment to the next cache line on the page. Other methods for searching the page are contemplated. The other cachelines on the page can be searched in any desired manner. In one or more embodiments after a synonym is detected, the same translation is used to find other cache lines on that page, that are tagged in the virtual cache. In one or more embodiments, when the algorithm for identifying synonyms detects a synonym related cache miss on the first access to a page, a state machine will be allocated to find other synonyms (aliases) within that page.

At 450, the method 400 determines whether there are other cache line on that page. In an aspect, the state machine used to find the first synonym is allocated to search and find additional cachelines in the page that corresponds to the virtual address of the access that missed in the virtual cache. If there are no additional cache lines on the page (450: No), then the process continues to 460 where the renaming process is finished. If there are other cache lines within the page (450: Yes), then the process continues to 455 where it is checked whether the additional cacheline on the page is tagged in the virtual cache. If the additional cacheline on the page is not in the virtual cache (455: No), then the process 400 continues to 450 where it is determined whether there is another additional cacheline in the page that corresponds to the virtual address of the access that missed, and the process continues to either 455 or 460 as shown in FIG. 4. If the additional cacheline found in the page is tagged in the virtual cache (455: Yes), then the process 400 continues to 425 where the virtual address in the virtual cache is updated to the virtual address that missed in the virtual cache. In other words, the virtually tagged cache's tag store is updated to the new virtual address that the renamer is using. The process for checking for other synonyms is repeated until there are no other cachelines on the page corresponding to the virtual address of the virtual cache access miss.

In one or more embodiments, when the algorithm for identifying synonyms indicates a synonym related cache miss on an access to a page, a state machine will be allocated to find other synonyms (aliases) within the page, and rename them in the virtually tagged cache ahead of the demand. The advantage of the method and system is that it is a low cost way to address the synonym or alias problem of virtually tagged cache's that do not use a lot of processor area, or processor power, and does not hurt the critical path of the processor.

While the illustrative embodiments described above are preferably implemented in hardware, such as in units and circuitry of a processor, various aspects of the illustrative embodiments and/or techniques may be implemented in software as well. For example, it will be understood that each block of the flowchart illustrations in FIG. 4, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system comprising:
  a virtual cache having a plurality of entries having a virtual address and associated data;
  a physical cache having a plurality of entries for storing data; and
  a processor,
  wherein the system is configured to:
  check if an access demand to the virtual cache missed because of a synonym tagged in the virtual cache;
  in response to the access demand to the virtual cache missing because of a synonym tagged in the virtual cache, update the virtual address tag in the virtual cache to a new virtual address tag;
  search for additional synonyms tagged in the virtual cache, wherein searching for additional synonyms tagged in the virtual cache comprises moving to another cache line on the page that corresponds to the virtual address of the virtual access demand that missed in the virtual cache; and
  in response to finding additional synonyms tagged in the virtual cache, update the virtual address tag of the additional synonyms to the new virtual address tag.

2. The system of claim 1, wherein the system configured to check if the access demand to the virtual cache missed because of a synonym tagged in the virtual cache comprises the system configured to allocate a search algorithm to determine if the virtual address that missed in the virtual cache would have hit in the cache if it were a physical cache.

3. The system of claim 1, wherein the system configured to check if the access demand to the virtual cache missed because of a synonym tagged in the virtual cache comprises the system configured to determine whether the virtual address of the access demand to the virtual cache has the same physical address of any other virtual address tagged in the virtual cache.

4. The system of claim 1, further comprising the system configured to translate the virtual address of the access demand that missed in the virtual cache to a real address.

5. The system of claim 1, further comprising the system configured to update, in response to the access demand to the virtual cache missing in a virtual cache because of a synonym tagged in the virtual cache, the virtual address tag in a virtual cache directory to the virtual address tag of the virtual cache access demand.

6. The system of claim 1, further comprising the system configured to update, in response to the virtual cache having additional synonyms in the virtual cache, the virtual address tag of at least one of the additional synonyms in the virtual cache to the virtual address tag corresponding to the virtual address of the virtual cache access demand that missed in the virtual cache.

7. The system of claim 1, wherein the system configured to search for additional synonyms tagged in the virtual cache further comprises the system configured to search for other cache lines within the page corresponding to the virtual address tag of the virtual cache access demand that missed in the virtual cache.

8. The system of claim 7, further comprising a state machine to search for additional cache lines within the page, and the system id configured to allocate the state machine to search for additional cache lines within the page.

9. The system of claim 7, further comprising the system configured to determine, in response to finding additional cache lines within the page corresponding to the virtual address of the virtual cache access demand that missed in the virtual cache, whether the additional cache lines are in the virtual cache.

10. The system of claim 9, further comprising the system configured to update, in response to the additional cache lines being in the virtual cache, the virtual address of the additional cache lines.

11. The system of claim 10, wherein the system configured to update the virtual address of the additional cache lines comprises the system further configured to rename the virtual address of the additional cache lines to the virtual address of the virtual cache access demand that missed in the virtual cache.

12. The system of claim 1, further comprising the system configured to overrule, in response to the virtual cache access demand missing in the virtual cache because of synonym tagged in the virtual cache, the virtual cache eviction mechanism and rename the virtual address tag of the real address with the virtual address tag of the virtual address that missed in the virtual cache.

13. The method of claim 1, further comprising a state machine that collects the virtual address and page size of the access that missed in the virtual cache and the system configured to allocate, in response to the access demand missing in the virtual cache because of a synonym tagged in the virtual cache, the state machine to collect the virtual address and page size of the access that missed in the virtual cache.

14. A system of handling access demands in a virtual cache comprising:
- a virtual cache having a plurality of entries having a virtual address and associated data;
- a physical cache having a plurality of entries for storing data;
- a processor; and
- a non-transitory computer-readable storage medium comprising program instructions that when executed by the processor cause the processor to:
  check if an access demand to the virtual cache missed because of a synonym tagged in the virtual cache;
  in response to the access demand missing in the virtual cache because of a synonym tagged in the virtual cache, update the virtual address tag in the virtual cache to a new virtual address tag;
  search for additional synonyms tagged in the virtual cache, wherein searching for additional synonyms tagged in the virtual cache further comprises searching for other cache lines within the page corresponding to the virtual address tag of the virtual cache access demand that missed in the virtual cache;
  in response to finding other cache lines within the page corresponding to the virtual address tag of the access demand that missed in the virtual cache, determine whether the other cache lines are in the virtual cache; and
  in response to determining that the additional cache lines are in the virtual cache, update the virtual address tag of the other cache lines to the new virtual address tag.

15. The system of claim 14, wherein the program instructions that when executed by the processor cause the processor to check if the access demand missed in the virtual cache because of a synonym tagged in the virtual cache comprises program instructions that when executed by the processor cause the processor to allocate a search algorithm to determine if the virtual address that missed in the virtual cache would have hit in the cache if it were a physical cache.

16. The system of claim 14, wherein the program instructions that when executed by the processor cause the processor to check if the access demand missed in the virtual cache because of a synonym tagged in the virtual cache comprises program instructions that when executed by the processor cause the processor to determine whether the virtual address of the virtual access demand has the same physical address of any other virtual address tagged in the virtual cache.

17. The system of claim 14, further comprising a virtual cache directory and program instructions that when executed by the processor cause the processor to update, in response to a virtual cache access demand missing in a virtual cache because of a synonym tagged in the virtual cache, the virtual address tag in the virtual cache directory to the virtual address tag of the virtual cache access demand.

18. The system of claim 14, further comprising a state machine to search for the other cache lines within a page wherein the system further comprises program instructions that when executed by the processor cause the processor to allocate the state machine to search for the other cache lines within a page, and wherein the program instructions that when executed by the processor cause the processor to search for additional synonyms tagged in the virtual cache comprises program instructions that when executed by the processor cause the processor to move to another cache line on the page that corresponds to the virtual address of the virtual access demand that missed in the virtual cache.

19. The system of claim 14, wherein the program instructions that when executed by the processor cause the processor to update of the virtual address of the additional cache lines comprises program instructions that when executed by the processor cause the processor to rename the virtual address of the additional cache lines to the virtual address of the virtual cache access demand that missed in the virtual cache.

20. The system of claim 14, further comprising program instructions that when executed by the processor cause the processor to overrule, in response to the access demand missing in the virtual cache because of a synonym tagged in the virtual cache, the virtual cache eviction mechanism and rename the virtual address tag of the real address with the virtual address tag of the virtual address that missed in the virtual cache.

* * * * *